April 24, 1934.  G. HORNER  1,956,505
FORMING GUIDE FOR ENGRAVING AND ALLIED MACHINES
Filed Sept. 1, 1933
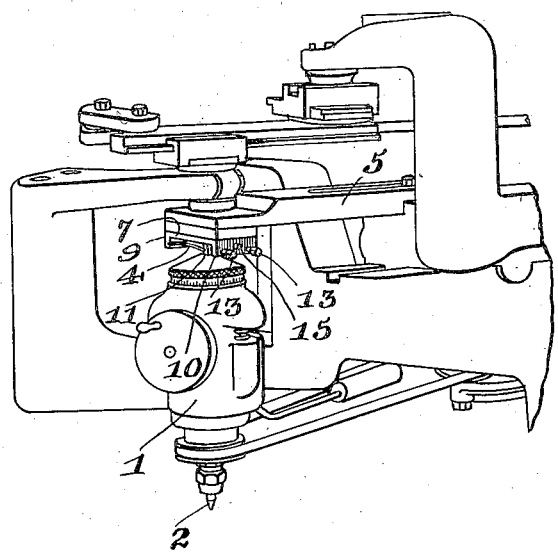
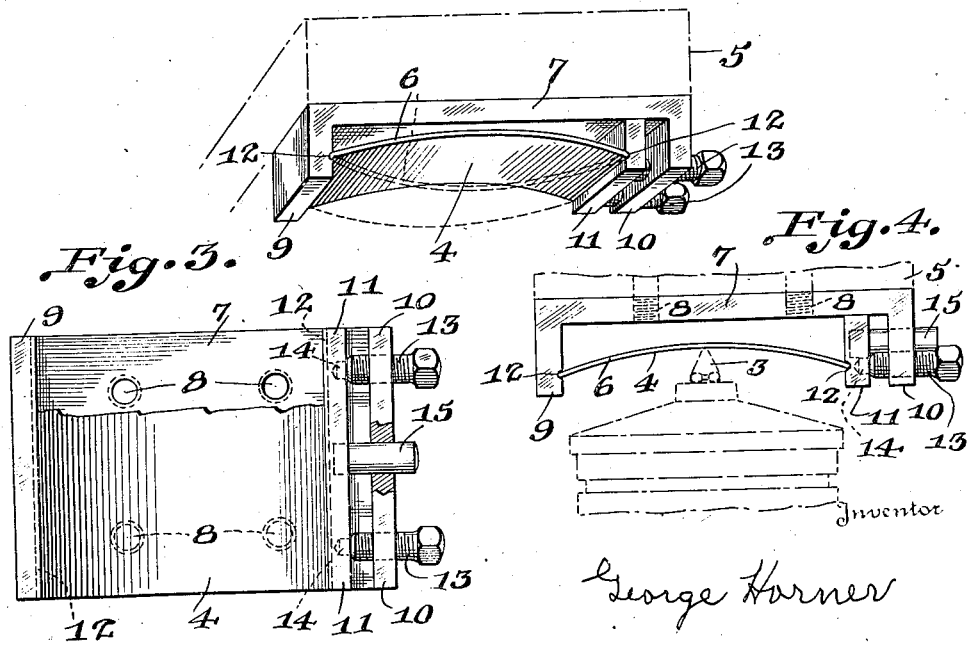
Inventor
George Horner
By
Hubert E Peck Attorney Patented Apr. 24, 1934

1,956,505

UNITED STATES PATENT OFFICE 1,956,505

FORMING GUIDE FOR ENGRAVING AND ALLIED MACHINES

George Horner, Racine, Wis., assignor to George Gorton Machine Company, Racine, Wis., a corporation of Wisconsin Application September 1, 1933, Serial No. 687,877

8 Claims. (Cl. 90—62)

This invention relates to forming guides for engraving and other machines, to which my invention is applicable or to which it can be adapted; and the objects and nature of the invention will be understood by those skilled in the art in the light of the following explanations of the accompanying drawing that illustrates what I now believe to be the preferred mechanical expression or embodiment of my invention from among other forms and arrangements within the spirit and scope thereof.

In engraving, die sinking, routing and other machines, where the cutter is to operate on or produce concave, convex or other than flat plane work surfaces, particularly where it is preferable to produce cuts of uniform depth throughout the curved area of the work being operated on, a laterally-movable cutter head is employed that in one machine type, is freely, universally movable laterally over the work while performing an engraving or cutting operation, by the movements of the stylus in tracing the pattern, through the medium of a pantograph or equivalent means, for causing the cutter to reproduce the pattern on the work in scaled relation. This cutter head carries a slide barrel for the driven rotary depending cutter spindle, the cutter spindle being free to rotate in said barrel but being carried longitudinally thereby as the barrel freely slides. This floating or vertically slidable barrel is usually spring-pressed toward a normally fixed top forming guide to hold against the guide surface a point or projection carried by said upper end of the barrel and longitudinally alined with the rotary cutter depending from the barrel. The forming guide is usually composed of a fixed block having a smooth bottom surface arranged oppositely, parallel with and of about the same dimensions as the curved surface of the work to be operated on by the cutter, and precisely corresponding to said area of the work surface in reverse, i. e., convex where the work surface in concave or vice versa, etc. whereby, as the cutter head is moved laterally to carry the rotating cutter to various portions of the curved surface to be operated thereon, the upwardly projecting barrel stop point will slide laterally over the oppositely curved surface of the forming guide to maintain a uniform longitudinal position of the working point of the cutter with respect to the work, say for the formation of cuts of uniform depth in the curved surface of the work throughout the particular engraving operation on the area of the work represented in reverse by the curved surface of the forming guide. This is but one example of the use of a forming guide that reproduces the surface of the work on which a laterally movable floating cutter is to operate.

As illustrated, for instance, by the guide block 50 of my Patent No. 1,562,237 of November 17, 1925, it has heretofore been the practice to provide engraving, die sinking, and routing machines, etc. capable of providing a floating cutter spindle to operate on curved surface work, with a solid forming guide block having a carefully and specially worked-out, curved guide surface, the reverse of the curved work surface, and an adjustable holder normally fixed to the machine for fixedly and removably holding such block with its guide surface in operative relation to the floatable cutter spindle. For each new and different piece of curved surface work to be operated on, it was necessary to laboriously prepare a separate forming guide block, for substitution in said holder for the previously employed block whose guide surface did not correspond to the curved surface of the new work. The preparation of the guide surface of a block was a comparatively expensive and time consuming operation by skilled operatives.

It is the object of this invention to provide a forming guide for such machinery, capable of adjustment or comparatively quick and easy setting, to duplicate in reverse various curved work surfaces differing in curvature, radius and area, with the end in view of avoiding the necessity of preparation of a separate guide block for each differing piece of curved work, and permitting the use of the one guide block with an adjustable or changeable guide surface.

A further object of the invention is to provide a forming guide with a smooth flexible guide surface that can be conveniently set to present either a convex or a concaved temporarily fixed guiding surface of the required radius.

A further object of the invention is to provide a forming guide with a renewable, replaceable, flexible smooth guiding surface capable of being flexed to and temporarily held in various degrees of curvature.

With the foregoing and other objects in view my invention consists in various novel features, combinations and/or arrangements, as more fully and particularly hereinafter described and specified.

Referring to the accompanying drawing, forming a part hereof:—

Fig. 1 more or less diagrammatically illustrates an engraving, routing or die sinking machine, in part, as an example, from among others, showing an embodiment of my invention applied thereto.

Fig. 2 is a detached perspective of the forming guide and its holder, the forming guide sheet being shown in convexed form by dotted lines, and in concave form by full lines.

Fig. 3 is a detached bottom plan of the forming guide and its holder, the forming guide sheet, and the holder, being partially broken away.

Fig. 4 is a detached edge elevation of the forming guide and its holder, a floating cutter head being indicated by dotted lines.

In Fig. 1 of the drawing, I illustrate, in part, any machine to which my invention is applicable or to which it can be adapted. In this example, I show a cutter head 1, suitably supported, as by the common jointed links for universal lateral or horizontal movement over the work, under the control and actuation of any suitable means such as a suitable pantograph carrying a stylus for tracing the copy or pattern that is to be reproduced in scaled relation on the work by a cutter head. For instance, the operator in manually moving the stylus laterally in causing the same to trace the pattern, thereby through the medium of the pantograph correspondingly moves the cutter head laterally in such scaled relation as depends on the adjustment or structure of the pantograph. However, I do not wish to limit my invention to this particular type of machine.

The cutter head carries a driven rotary cutter spindle provided with or adapted to carry and drive a depending rotary cutter 2, for operation on the work clamped on the work table below the cutter head. Where curved surface work is to be operated on, the cutter spindle is rendered vertically or longitudinally floatable or movable toward and from the work and this spindle is equipped with or is then under the control of an expansion spring constantly tending to move the same longitudinally upwardly to its limit of upward movement, determined by an upwardly projecting abutment point or projection 3, preferably alined with the longitudinal axis of the cutter spindle and normally rigid therewith to control the depression thereof as well as to limit its upward movement.

This upwardly projecting spindle point 3, at its top extremity bears upwardly against and abuts the curved smooth bottom surface 4 of a forming guide and is laterally slidable thereon. The curved guide surface 4, is in reverse a duplicate of the curved surface area of the work that is to be acted on by the cutter during an engraving operation, and in the example illustrated, said surface 4, is arranged directly above and in vertical alinement with said curved surface of the work and is preferably somewhat larger in area than the area of the curved surface to be engraved upon, and is correspondingly convex or concave where the curved work surface is concave or convex.

The general organization and combination can be, for instance, such as generally indicated by my before mentioned Patent No. 1,562,237, although my invention is not limited to such general machine and organization, and if so desired, my forming guide surface can be supported from the machine frame or otherwise by a bracket generally such as illustrated in said patent whereby the forming guide surface can be set above and parallel with any area of the work on work table and at various elevations and at any desired angle within a suitable horizontal plane. In the drawing, I diagrammatically illustrate any suitable, normally-fixed forming-guide supporting arm or bracket 5, adjustable or otherwise supported from the machine frame or other support so as to overhang or extend above the cutter head and the point 3. A forming guide holder 7, is adjustably or otherwise normally fixed to said support 5, preferably so as to assume a horizontal position below support 5, and above the range of lateral movements of the point 3, during an engraving or cutting operation on the curved area of work located below and alined with said holder. This holder is usually removably bolted or otherwise normally fixed to support 5, when adjusted to the desired position. The curved guide surface 4, is smooth so that the point 3, can freely slide in any lateral direction thereon while held upwardly thereagainst under spring or other pressure.

This guide surface 4, is formed and provided by a hard spring or resilient, normally flat, smooth-faced sheet 6, of any suitable material that can be flexed and held to provide a curved guide surface 4, of the required radius and surface area, either convex or concave. The sheet 6, is preferably removably held by the holder 7, so that sheets of various areas and sizes can be successively held thereby within the capacity of the holder. The sheet 6, can be of any suitable gage or thickness as well as of the required stiffness to withstand the thrust of the point 3, without being thereby flexed. Without intending to thereby limit my invention to any particular material or the approximate thickness thereof, I find flat spring steel of approximately .025" in thickness, among other sheet material and gages, satisfactory for my purposes.

The holder whereby any suitable spring material can be flexed to the desired curvature and thus held with its so-curved bottom surface exposed for the universal lateral sliding travel of the point 3, thereon, can be of any suitable construction for the purposes intended, and can be held in any manner or by any suitable means to support 5.

Merely as an example, I show holder 7, providing a longitudinally elongated flat base, the usually flat outer or upper face of which fits the usually horizontal face of the support 5, with the holder held in a horizontal position above and vertically alined with the work.

Merely as an example of a simple form, the holder 7 can be removably secured to the support 5, by one or more bolts or machine screws 8, although I do not wish to so limit my invention.

The base 7, is here shown formed with rigid depending parallel end flanges 9, 10, of substantial length, vertically as well as transversely of the base and of the necessary thickness to give the required strength.

The under surface of the base, in this mere example is flat and horizontal between said vertical end flanges. A follower 11, is arranged transversely across the flat under face of base 7, between the end walls or flanges 9, 10, and is bodily slidable longitudinally of said face toward and from end wall 9, while maintaining its position parallel therewith. The vertical width of follower 11, is at least equal to the substantial vertical width of end wall 9, below the plane of the flat under face of base 7. The end wall 9, and the follower 11, cooperate to flex and hold a sheet 6, arranged between said elements 9, 11, with its end edges abutting and held thereby, and with the sheet arranged longitudinally of and below base 7. For instance, the inner or adjoining vertical faces of the elements 9, 11, can each be formed with a horizontal sheet edge receiving and retaining seat or groove 12, extending throughout the length of each said element with the ends of the grooves opening through the vertical end edges of said element so that the sheet 6, received and held thereby can be of greater front to rear width than the horizontal front to rear length of the elements 9, 11.

Each groove 12, in the example shown, is preferably approximately V-shape in cross section with an approximately rounded central floor, to permit the sheet ends to extend at an upward or at a downward inclination from its end edges seated against the groove floors.

It is obvious that application of sufficient inward compressing pressure longitudinally of the sheet held by the elements 9, 11, by relative approaching movement of said elements will cause the sheet to centrally flex or buckle either upwardly or downwardly to the flat curvature of the desired radius. The central upward flexing or bending of the sheet 6, will be limited by the engagement of its center with the bottom flat face of base 7, while the central downward flexing of the sheet 6, will be limited by the form and depth of the sheet retaining grooves 12.

Various means can be provided for causing relative approaching sheet-flexing movement between the sheet retaining elements 9, 11, and for holding the same and the sheet in the desired adjustment and curved form.

For instance, I show follower-forcing rotary headed screws or threaded bolts 13, passing transversely through the end wall 10, and longitudinally adjustable in tapped holes in said wall with which the screw threads mesh. The dog points 14, of these set screws 14, are preferably cylindrical and reduced in diameter and fit and turn in sockets opening through the outer vertical side of follower 11.

The follower is held to its straight line path of sliding movement along the horizontal bottom face of base 7, by any suitable means such as slide pin 15, rigid with the follower and slidably confined in a transverse guide hole therefor through end wall 10.

Sheets 6, of various dimensions within the capacity of the particular holder, can be successively employed therein, and while the removability and replacement of the sheets 6, constitutes a valuable feature of my invention, yet I do not wish to so limit myself, as the broad feature of my invention concerns a forming guide surface produced by flexing a resilient sheet to the required curvature either concave or convex, whether the sheet is removably held by a holder or otherwise.

What I claim is:—

1. A forming guide for machines having a floating cutter spindle for operating on curved work, embodying a resilient flexed sheet providing the forming guide curved surface, and means for holding said sheet flexed to the curvature in reverse of the surface to be operated on.

2. A forming guide for the purposes substantially as described, having a smooth, curved guiding face adjustable to produce either a convex or a concave surface of the required curvature, and means for adjusting the same to the required convex or concave curvature and for holding the same in the position to which adjusted.

3. In a machine having a floating cutter spindle for operating on the curved surface of work, a forming guide having its spindle-guiding, curved surface formed by a resilient smooth-faced sheet flexed to correspond in reverse to the curved surface of the work to be operated on by the cutter of the floating spindle, and a holder for said sheet adjustable to hold the sheet in operative position when flexed to different curvatures.

4. A forming guide for the purposes stated, embodying a resilient sheet flexed to provide either a convex or a concave spindle guiding surface of the required radius, and a holder to maintain the sheet in operative concaved and convexed positions.

5. A forming guide embodying a sheet providing the guiding surface and an adjustable flexing and retaining holder for maintaining said sheet in operative curved flexed positions.

6. A forming guide embodying a removable and replaceable thin resilient metal sheet forming the spindle guiding surface of said guide, and capable of being variously flexed and bent to successively provide guiding surfaces of different radii, and a holder having opposing abutments between which the sheet is held in operative flexed position, said abutments having retaining sockets receiving opposite sheet edges, said holder providing means for varying the distance between said abutments.

7. A forming guide for floating cutter spindle machines, embodying a holder for a thin spring guiding surface forming sheet, and means for flexing said sheet to various curvatures either convex or concave and for retaining the same at the curvature to which bent.

8. A forming guide for floating cutter spindle machines, embodying a thin spring hard-surface sheet, and an adjustable clamp for holding said sheet and applying longitudinal pressure thereto to bend the sheet centrally upwardly or downwardly and thus hold the same.

GEORGE HORNER.